(12) United States Patent
Hall et al.

(10) Patent No.: US 7,031,286 B1
(45) Date of Patent: Apr. 18, 2006

(54) METHOD AND AN ARRANGEMENT IN A MOBILE RADIO SYSTEM

(75) Inventors: Göran Hall, Möldal (SE); Chris Kannas, Vårgårda (SE); Richard Persson, Mölndal (SE); Hans-Olof Sundell, Öckerö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/343,165

(22) Filed: Jun. 29, 1999

(30) Foreign Application Priority Data

Jun. 30, 1998 (SE) .................................... 9802342

(51) Int. Cl.
*H04L 12/56* (2006.01)
*H04L 12/66* (2006.01)

(52) U.S. Cl. .................. 370/338; 370/349; 370/401

(58) Field of Classification Search ............... 370/310, 370/389, 392, 393, 901, 902, 908, 912, 913, 370/331, 338, 401, 349
See application file for complete search history.

(56) References Cited

U.S. PATENT DOCUMENTS

| | | | | |
|---|---|---|---|---|
| 5,159,592 | A | | 10/1992 | Perkins ...................... 370/85.7 |
| 5,166,931 | A | | 11/1992 | Riddle ........................ 370/94.1 |
| 5,410,543 | A | * | 4/1995 | Seitz et al. .................. 370/463 |
| 5,442,633 | A | * | 8/1995 | Perkins et al. .............. 370/331 |
| 5,461,627 | A | | 10/1995 | Rypinski .................... 370/95.2 |
| 5,572,528 | A | * | 11/1996 | Shuen ........................ 370/402 |
| 5,708,655 | A | | 1/1998 | Toth et al. .................. 370/313 |
| 5,781,550 | A | * | 7/1998 | Templin et al. ............. 370/401 |
| 5,787,111 | A | * | 7/1998 | Gilmore ...................... 375/130 |
| 6,088,337 | A | * | 7/2000 | Eastmond et al. .......... 370/280 |
| 6,141,690 | A | * | 10/2000 | Weiman ...................... 709/227 |
| 6,353,614 | B1 | * | 3/2002 | Borella et al. .............. 370/389 |
| 6,430,623 | B1 | * | 8/2002 | Alkhatib ..................... 370/390 |

FOREIGN PATENT DOCUMENTS

| | | |
|---|---|---|
| JP | 09098190 A | 4/1997 |
| JP | 10032610 A | 2/1998 |
| WO | WO 95/27942 | 10/1995 |
| WO | WO 97/02734 | 1/1997 |
| WO | WO 97/40610 | 10/1997 |
| WO | WO 97/48210 | 12/1997 |

OTHER PUBLICATIONS

"Configuring Network Address Translation". Dial Solutions Configuration Guide. Cisco Systems. Paper Published Jan. 14, 1998. pp. DC-693-DC to DC-706.*
Klemets et al. "MINT—A Mobile Internet Router". IEEE Global Data Networking. Dec. 12, 1993-Dec. 15, 1993. pp. 70-74.*

* cited by examiner

*Primary Examiner*—Ricky Q. Ngo
*Assistant Examiner*—Derrick W. Ferris

(57) ABSTRACT

The invention relates to a mobile LAN including a number of hosts interconnected by a communication media. Routing means and a mobile station is connected to the LAN. A host on the LAN may perform a packet data communication with an external host via the routing means and the mobile station. Translation means is connected to the routing means for the temporary translation of a locally defined network layer address assigned to a host on the LAN into a globally defined network layer address when the host on the LAN performs a packet data communication with an external host.

5 Claims, 4 Drawing Sheets

METHOD AND AN ARRANGEMENT IN A MOBILE RADIO SYSTEM

TECHNICAL FIELD OF THE INVENTION

The invention relates to a mobile LAN, and a method in a mobile LAN. A local area network, LAN is generally understood to be a set of computer hosts, interconnected by a transmission medium, enabling communication between the different hosts. A mobile LAN is, in the context of this application, a LAN where hosts connected to the LAN may communicate with hosts, connected to networks remote from the LAN, via routing means and a mobile station operating in a mobile radio system.

DESCRIPTION OF RELATED ART

Mobile LANs are useful not only in truly mobile applications, such as trains or buses. They are also useful when a LAN is set up temporarily, such as on trade fairs or athletics games. On these occasions it is often difficult to use the fixed telephone network and therefore a mobile LAN is a competitive alternative.

A mobile LAN involves a number of hosts. In many applications this number is relatively low, 5–10 hosts is considered a normal number. However, mobile LANs with a substantially larger number of hosts are also possible.

The hosts are interconnected by a transmission medium, such as a coaxial cable and they communicate with each other by using a predetermined communication protocol. Hosts on the LAN may receive data packets from and transmit data packets to hosts connected to networks remote from the mobile LAN via routing means and a mobile station operating in a mobile radio system. These packets may, for instance, be transmitted over the Internet where the TCP/IP protocol suite is used.

An important issue when dealing with routing of packet data over clusters of networks, such as the Internet, is how to provide necessary addressing features. For a packet to reach its proper destination, this destination needs a unique address which is referred to as a network layer address. This address is included in all data packets and, therefore, all routers in the network will pass incoming packets in an appropriate direction. One part of this address is preferably associated with the network in which the host resides and another part is preferably an identifier for the particular host in the network.

Therefore, a host that is attached to a mobile LAN must be provided with a globally defined network layer address, such as an IP address, in order to perform a communication with a host attached to a network remote from the mobile LAN. A globally defined address is unique in the cluster of networks where it is used.

One feasible method to provide hosts on a mobile LAN with network layer addresses is to retrieve such an address from the mobile radio system, in which the mobile station associated with the mobile LAN operates. Such a method may be derived from U.S. Pat. No. 5,708,655, which is incorporated herein by reference. When a host in such a system requests a network layer address this request is transmitted to the mobile radio system by the mobile station connected to the host. Then the mobile radio system retrieves a network layer address from a pool of available addresses in the system or from an Internet Service Provider associated with the mobile radio system. An Internet Address Server is updated so that data packets bearing the retrieved address are routed towards the appropriate mobile station. Then the network layer address is communicated to the host in question and packet data communication may commence over a packet data channel between the mobile station and the mobile radio system in which it operates.

For a host that is being attached to a mobile LAN it is a rather complicated and time consuming procedure to retrieve a network layer address from the mobile radio system where the mobile station, connected to the mobile LAN, operates. Thus there will be a substantial delay before a host on the LAN, requesting to perform a packet data communication with an external host, will be able to perform such a communication. Moreover, if network layer addresses are to be allocated and deallocated frequently over the air interface of the system these operations will add load to the system, particularly from increased control traffic.

SUMMARY OF THE INVENTION

One object of the present invention is to achieve a mobile LAN of the initially mentioned kind, where hosts that are attached to the LAN may perform packet data communications with hosts attached to external networks in an efficient way.

Another object of the invention is to provide a mobile LAN that can initialize a packet data communication between a host connected to the LAN and a host attached to an external network, via routing means and a mobile station connected to the LAN and operating in a mobile radio system, with reduced load on this system during the initialization.

These objects are achieved, according to one aspect of the invention, in a mobile LAN of the initially mentioned kind where a set of locally defined network layer addresses are used internally to the LAN. Locally defined addresses are unique in the network where they are used, and packets with these addresses cannot be transferred to other networks. A number of unique, globally defined network layer addresses are stored in storing means, connected to the routing means. When a host on the LAN wishes to perform a packet data communication with a host on an external network, the internally defined address assigned to this host is temporarily translated into one of the globally defined addresses stored in the storing means.

The result of these measures is that a host attached to a mobile LAN can begin a packet data session without performing any initialization process over the air interface between the mobile station associated with the LAN and the mobile radio system in which the mobile station operates. Therefore, a packet data communication can be initiated faster and more efficiently and the mobile radio system need not be unnecessarily loaded by this initialization.

The translation procedure may be completely transparent to the host on the LAN. When such a host attempts to perform a packet data communication with an external host the translation is performed automatically. Therefore a host on the LAN may act as if its locally defined address actually was globally defined.

In a preferred embodiment the above mentioned translation procedure is designed to change a destination address field of data packets moving into the mobile LAN from the globally defined address into the locally defined address. This procedure is adapted to the TCP/IP protocol suite.

In another preferred embodiment the above mentioned translation procedure is designed to change a source address field of data packets moving out of the mobile LAN from the locally defined address into the globally defined address. This procedure is adapted to the TCP/IP protocol suite.

In yet another preferred embodiment, the devices associated with the above mentioned routing, address translating and storing are integrated in the mobile station associated with the mobile LAN. This provides a robust unit and makes the preparation of a mobile LAN quicker.

In yet another preferred embodiment, with the number of globally defined addresses stored in the storing means is one. This reduces complexity in the software- and hardware employed in the storing and address translating. Nevertheless, external connectivity for a number of hosts is maintained, since those hosts may share the single address. If communication with external hosts is performed only occasionally the risk of more than one host on a LAN wishing to perform such a communication at a given time is rather low.

Another aspect of the invention, includes a method for establishing a packet data communication between a host among a first number of interconnected hosts and a host connected to an external network, utilizing globally defined addresses. The data packets of the communication are routed, over an air interface and sent over the external network. A set of locally defined and internally used addresses is used for data packets to be communicated by the host among the first number of hosts. A number of globally defined addresses of the kind used in the external network are stored and one of the internally used addresses is temporarily translated into one of these globally defined addresses.

In a preferred embodiment of the present invention, the temporary translation of a locally defined address assigned to a host is terminated when this host has not transmitted nor received any data packet for a predetermined time. This method allows the global addresses in the storing means to be efficiently used.

DETAILED DESCRIPTION OF EMBODIMENTS

Figure 1:
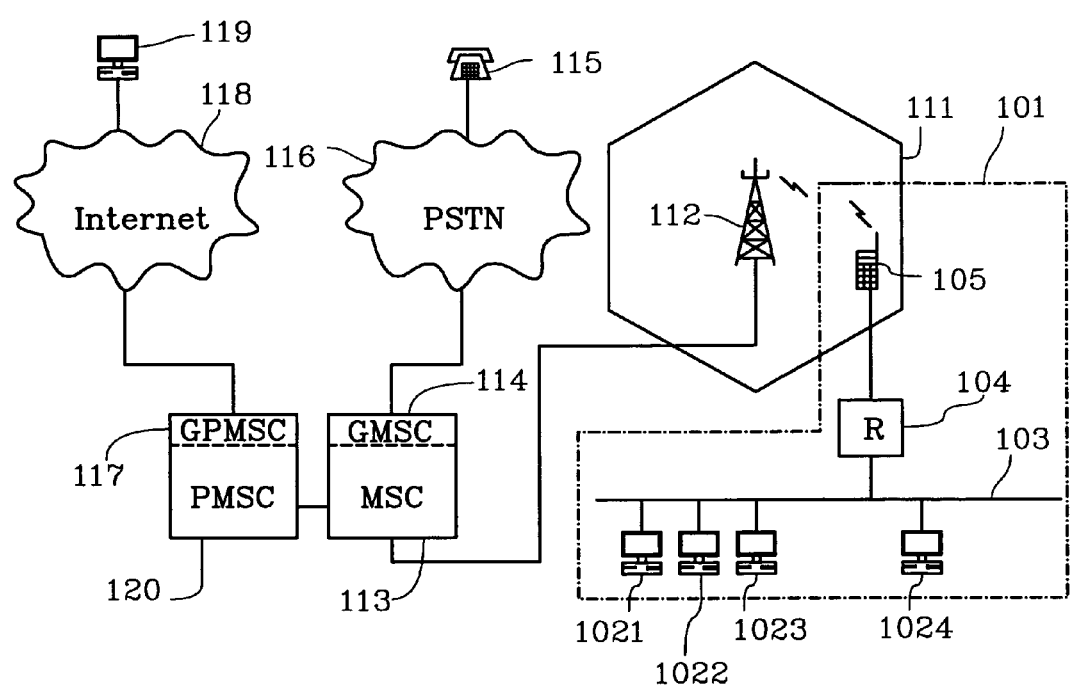
FIG. 1 illustrates generally a mobile LAN connected via a cellular radio system as is known in the art.

FIG. 1 illustrates a mobile LAN 101 included in a cellular radio system. A number of hosts, e.g. computers 1021–1024, are interconnected by a transmission medium 103 and may communicate with each other via this medium. Router 104 is connected to or included in the LAN and routes packet data to and from the LAN 101. The router 104 may also route packet data between hosts on the LAN 101. A mobile station 105, capable of performing packet data transmission, is connected to the router 104 and operates in a mobile radio system.

The mobile radio system in this known embodiment is a cellular public land mobile network. This network includes a number of cells 111, each defining a geographical area. At least one base station 112 operates in each cell, performing communication with mobile stations in this cell over the air interface. Each base station 112 is connected to a Mobile Services Switching Center (MSC) 113. In some systems, such as the GSM system, a base station controller BSC (not shown) is connected between the base station 112 and the MSC 113. A number of base stations 112 are then connected to each BSC and a number of BSCs are associated with each MSC 113. There may be numerous MSCs 113 in a public land mobile network. The MSC 113 performs switching operations for all mobile stations residing in its cells 111. An MSC 113 is normally provided with a gateway, MSC (GMSC) 114 for switching voice traffic from mobile stations to fixed telephones 115 via the public service telephone network (PSTN) 116.

A Packet Mobile Services switching center (PMSC) 120 is connected to the MSC 113. As an alternative a PMSC 120 may be connected directly to a base station (not shown). In some embodiments a PMSC 120 may be integrated into an MSC 113.

A PMSC 120 is provided with a gateway for packet data traffic, GPMSC 117. A GPMSC 117 may have a direct connection to the Internet 118, or it may alternatively be connected to an Internet Service Provider, (ISP, not shown), performing Internet related functions for the PLMN. The Internet 118 in the context of this application may be any cluster of local and wide area networks utilizing unique network layer addresses.

Via the GPMSC 117, data packet communication may be performed between a host 1024 attached to the mobile LAN 101 and a host 119, remote from the LAN 101 and connected to the internet 118, given that both hosts are assigned unique network layer addresses. As earlier described, a network layer address may be dynamically assigned to a host 1024 on the mobile LAN 101 from the mobile network, in this case the PLMN or an ISP associated to the PLMN. This, however, requires that the network layer address is requested and distributed over the air interface, which has drawbacks as mentioned above.

Figure 2:
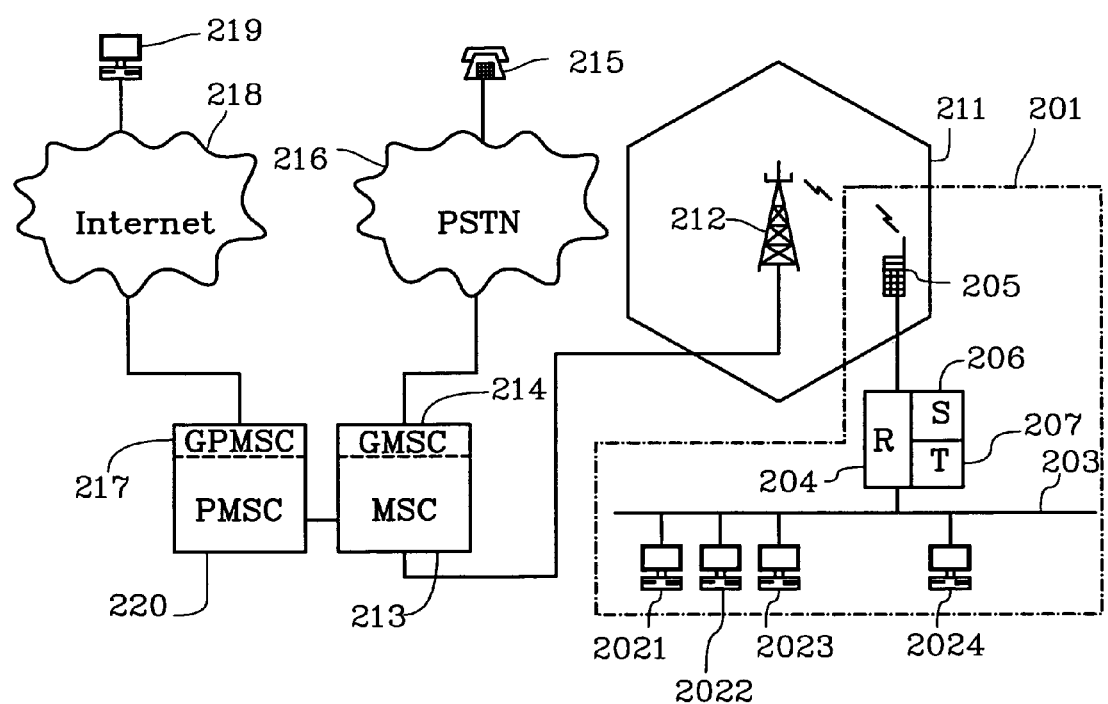
FIG. 2 shows a mobile LAN according to an embodiment of the present invention connected via a cellular radio system.

FIG. 2 shows a mobile LAN 201 according to the invention included into a cellular radio system. This LAN also comprises a number of hosts, e.g. computers 2021, 2022, 2023, 2024, interconnected by a transmission medium 203, such as a coaxial cable or an optical fibre, router 204 and a mobile station 205 as earlier described. The PLMN comprises cells 211, base stations 212, MSCs 213 and PMSC 220, MSC 213 includes GMSC 214 and PMSC 220 includes GPMSC 217. As earlier described these gateways provide connections to fixed telephones 215 via the PSTN 216, as well as packet data connections to remote hosts 219 via the Internet 218.

In order to render the packet data communication features of the mobile LAN more effective, memory 206 for storing a number of globally defined network layer addresses is connected to the router 204. Furthermore, address-translator 207 is connected to the router 204.

The hosts 2021–2024 on the LAN 201 are assigned locally defined network layer addresses that are used within the LAN 201. If a first host 2024 on the LAN 201 requests to perform packet data communication with a remote host, e.g. a host 219 connected to the Internet 218, the address translator 207 will temporarily translate the locally defined address of the first host 2024 into one of the globally defined addresses stored in the memory 206. Thereby, this globally defined address is temporarily assigned to the host 2024. This translation is transparent to the host 2024 on the LAN 201; the globally defined address need not be communicated to the first host 2024. The translation procedure will be given a more detailed description below.

In a preferred embodiment of the present invention, router 204, memory 206 and the address translator 207 are integrated in the mobile station 205. This provides a robust unit, which enables quick preparation of a mobile LAN 201.

When a host on the LAN which has been assigned a globally defined network layer address has not received nor transmitted any packet data via the address translator 207 for a predetermined time, the assignment of the globally defined address is withdrawn and this address may be reused by any host 2021–2024 on the LAN 201.

The globally defined network layer addresses stored in the memory 206 may be maintained in different ways. As one alternative these addresses are permanently assigned to a subscription associated with the mobile station 205, i.e. a certain identification unit such as a SIM-card used in the mobile station 205. In this case no further preparations need be made when a mobile-LAN is prepared. The PLMN knows already how to route data packets to the LAN 201 if it knows where the mobile station 205 associated with this subscription resides.

Another alternative is to assign a set of globally defined network layer addresses when the mobile LAN is initially set up. Then these addresses are retrieved from the PLMN or an ISP associated with the PLMN. This requires, as earlier described, initialization procedures over the air interface, but in this case this procedure need only be performed once.

If the number of addresses in the memory 206 is only one, then the software and the hardware in memory 206 and address translator 207 may be substantially simplified. This allows low-cost units to be produced.

Figure 3:
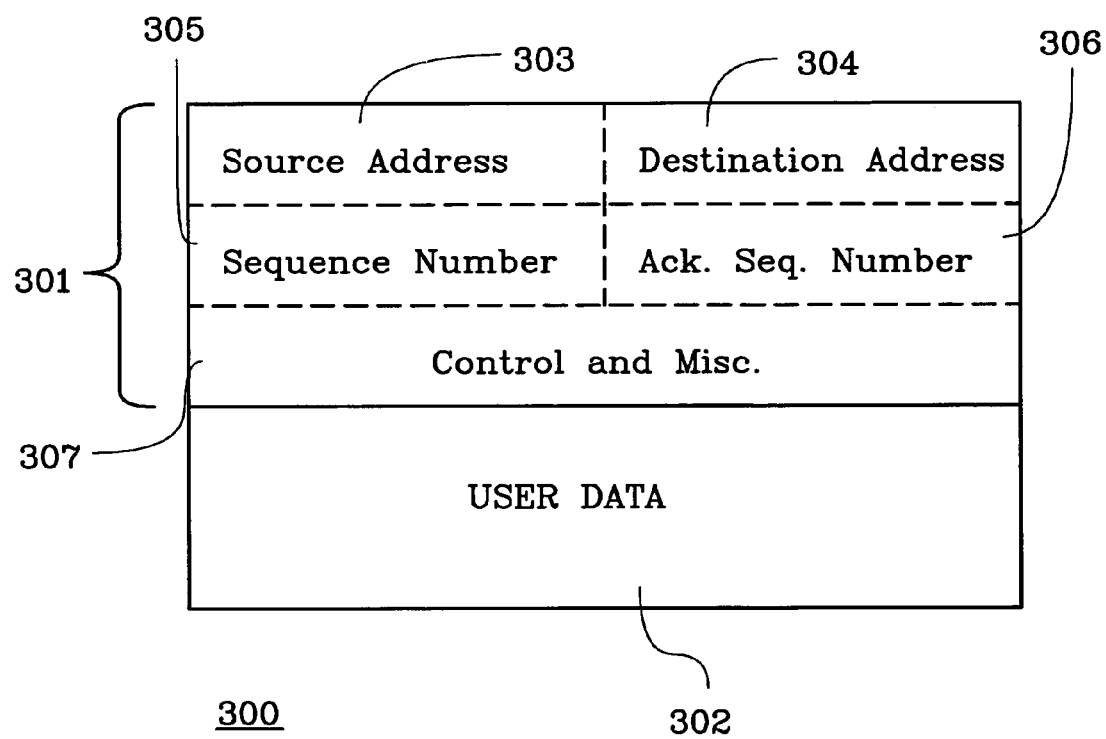
FIG. 3 shows the structure of a data packet utilized by an embodiment of the present invention.

FIG. 3 shows the structure of a data packet 300 as sent from a host 2021–2024 in the LAN or from a remote host 219 in the global network 218. The packet includes a header part 301 and a user data part 302. The header part 301 involves fields of information 303–307 needed for the transmission of the packet 300 to be completed. The user data part 302 includes the information to be transmitted.

The source address field 303 contains the network layer address of the host that the packet was sent from and the destination address field 304 contains the network layer address where the packet is to be sent. The sequence number field 305 contains the sequence number of the packet and is required since packets not always arrive in the same order they were sent. The acknowledge sequence number field 306 is used to acknowledge that a data packet has reached its destination. The header part 301 also includes a number of miscellaneous and control fields 307. These are used, among other things, to verify that a packet has been transmitted in an uncorrupted manner.

The earlier mentioned translation procedure, performed in the address translator 207 preferably includes changing the source address field 303 of a data packet 300, moving out of the mobile LAN 201, from the locally defined address assigned to the host 2024 into the globally defined address temporarily assigned to the host 2024. When a data packet moves into the LAN 201 the translation procedure includes changing the destination address field 304 of the packet 300 from the globally defined address temporarily assigned to the host 2024 into the locally defined address assigned to the host. These procedures are preferably software implemented.

Some of the miscellaneous and control fields 308 may be dependent upon the address fields that are changed. Therefore, when changing an address field 303 or 304, any field 307 depending thereupon should be changed accordingly. Otherwise the receiving side of the communication may find, incorrectly, that the packet 300 received has been corrupted. Address translators 207 have been described when used in large corporate networks, see IETF, RFC 1597 (Rekhter, Moskowitz, Karrenberg, de Groot) and 1631 (Egevang, Francis), which are included herein by reference. Therefore, procedures for adjusting control fields as mentioned above are known in the art.

Figure 4:
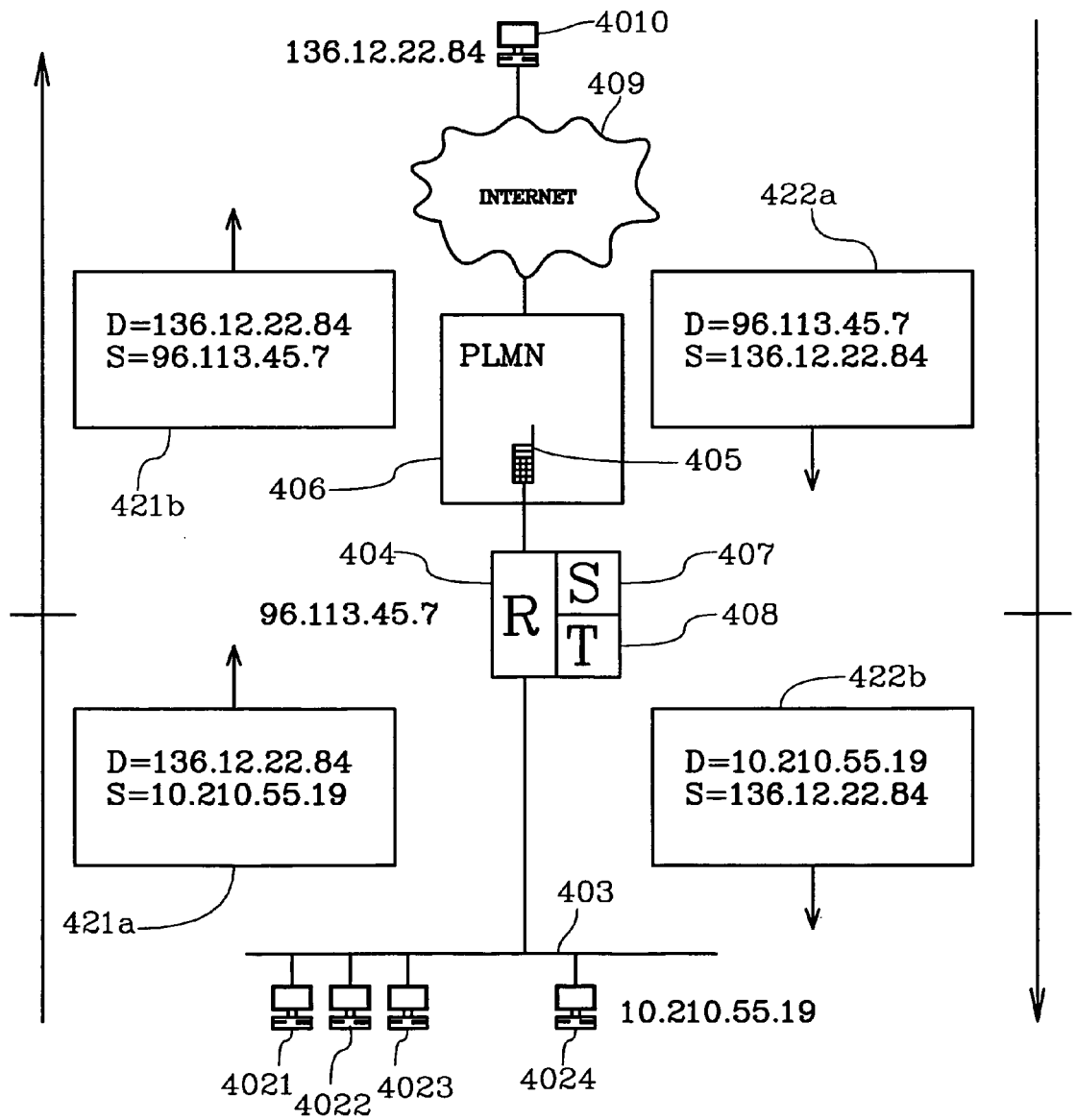
FIG. 4 illustrates examples of transmissions of packet data according to an embodiment of the present invention.

FIG. 4 illustrates examples of transmissions of packet data according the invention. A number of hosts 4021, 4022, 4023, 4024 are interconnected by a transmission medium 403 and form, together with router 404 and a mobile station 405, a mobile LAN. The mobile station 405 operates in a mobile radio system 406, which is connected to the Internet 409. Memory 407 for storing a number of globally defined network layer addresses and address translator 408 are connected to the router 404.

A first host 4024 is assigned a locally defined network layer address 10.210.55.19 in this example. The globally defined network layer address 96.113.45.7, stored in the memory 407, has been temporarily assigned to the first host 4024.

A data packet 421*a* is transmitted from this first host 4024 to a second host 4010 remote from the first host 4024 and connected to the Internet 409. The second host 4010 has the network layer address 136.12.22.84. Before the data packet 421*a* passes the address translator 408, the destination address is 136.12.22.84 and the source address is 10.210.55.19. When the same packet, now named 421*b*, has passed the address translating means 408 the destination address is 136.12.22.84 and the source address is 96.113.45.7. The source address is changed by the address translator 408 and the destination address is unchanged.

When a data packet 422*a* is sent in the opposite direction, the destination address, before the packet 422*a* reaches the address translator 408, is 96.113.45.7. The source address is 136.12.22.84. When the packet 422*a*, now named 422*b*, has passed the address translator 408 the destination address is 10.210.55.19 and the source address is 136.12.22.84. In this case the destination address has been changed by the address translator 408, while the source address is unchanged.

Memory 407 and the address translator 408 are preferably integrated as one unit and may be software implemented as a translation table. In a preferred embodiment of the present invention, this software is integrated with the software of the router 404.

The above-described embodiments serve only as examples of how the invention may be carried out, and do not by any means limit the scope of protection sought. Various other embodiments are possible. For instance, the invention is not limited for use in public land mobile networks such as the GSM system. The use of mobile LANs operating via satellite communications systems is one possible embodiment which is useful, for instance, when a mobile LAN is installed in a long distance aircraft. The invention may also be realized using other protocols than TCP/IP. For instance, the UDP/IP protocol which does utilize sequencing and acknowledging, may be used. Another possibility is the protocols following IPv6, which allow a substantially larger number of globally defined network layer addresses to be used.

The invention claimed is:

1. A mobile station, comprising:
   a router connected via a wireless communication link to at least one host connected to a mobile local area network (LAN), wherein the router receives packet data from the at least one host, said packet data including a locally defined network layer address suitable for transmission within the mobile LAN;
   means for wirelessly communicating with an external network;
   a memory connected to the router for storing a plurality of globally defined network layer addresses of the kind utilized in communicating data to at least one host connected in the external network; and an address translator connected to the memory and the router for translating between the locally defined network layer address utilized in the mobile LAN and one of the plurality of globally defined network layer addresses utilized in the external network;

wherein prior to a wireless communication with the external network, the address translator translates from the locally defined network layer address utilized in the mobile LAN to a first globally defined network layer address stored in the memory so long as successive communications between the at least one host in the mobile LAN and the at least one host in the external network occur within a predetermined period of time from each other; and wherein the address translator translates from the locally defined network layer address utilized in the mobile LAN to a second globally defined network layer address stored in the memory upon an affirmative determination that the successive communications between the at least one host in the mobile LAN and the at least one host in the external network occurred a period of time apart from each other that is greater than the predetermined period of time.

2. The mobile station of claim 1, wherein the address translator receives data packets originated in the external network and intended for the at least one host in the mobile LAN, and changes a destination address field of the packets from the globally defined network layer address to the locally defined network layer address.

3. The mobile station of claim 1, wherein the router receives translated packet data from the address translator and directs the translated packet data towards a wireless interface between the mobile LAN and the external network, and then to at least one host in the external network.

4. A method of communicating packet data between at least one host connected to a mobile local area network (LAN) and at least one host in a wireless external network, wherein a locally defined network layer address is utilized in the mobile LAN, and globally defined network layer addresses are utilized in the external network, said method comprising:

implementing a router in a mobile station that wirelessly communicates with the external network;

connecting the router via a communication link to the at least one host in the mobile LAN, wherein the router receives packet data from the at least one host in the mobile LAN, said packet data including the locally defined network layer address utilized in the mobile LAN;

storing in a memory in the mobile station, a plurality of the globally defined network layer addresses utilized in the external network;

determining whether successive communications between the at least one host in the mobile LAN and the at least one host in the external network occur within a predetermined period of time from each other;

prior to a wireless communication with the external network:

translation in an address translator in the mobile station, from the locally defined network layer address utilized in the mobile LAN to a first globally defined network layer address stored in the memory, upon determining that successive communications between the at least one host in the mobile LAN and the at least one host in the external network occur within the predetermined period of time from each other; and translating in the address translator in the mobile station, from the locally defined network layer address utilized in the mobile LAN to a second globally defined network layer address stored in the memory, upon determining that the successive communications between the at least one host in the mobile LAN and the external network occurred a period of time apart from each other that is greater than the predetermined period of time; and routing via a wireless link from the mobile station to the external network, the packet data received from the at least one host in the mobile LAN to the at least one host in the external network utilizing the translated globally defined network layer address.

5. The method of claim 4, further comprising:

receiving by the mobile station, packet data from the external network, said packet data including a globally defined network layer destination address identifying the at least one host in the mobile LAN;

translating in the mobile station, the globally defined network layer destination address in the packet data into a locally defined network layer destination address that identifies the identified host in the mobile LAN; and routing the packet data from the mobile station to the identified host utilizing the translated locally defined network layer destination address.

* * * * *

UNITED STATES PATENT AND TRADEMARK OFFICE
CERTIFICATE OF CORRECTION

PATENT NO. : 7,031,286 B1 Page 1 of 1
APPLICATION NO. : 09/343165
DATED : April 18, 2006
INVENTOR(S) : Hall et al.

It is certified that error appears in the above-identified patent and that said Letters Patent is hereby corrected as shown below:

Column 6, Line 58, in Claim 1, delete "wireless" before "communication".

Column 8, Line 11, in Claim 4, delete "translation" and insert -- translating --, therefor.

Signed and Sealed this

Twenty-seventh Day of November, 2007

JON W. DUDAS
*Director of the United States Patent and Trademark Office*